Figure 1:
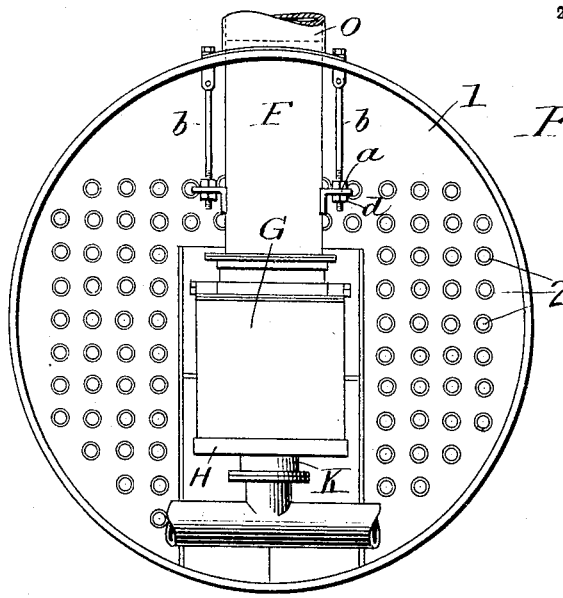

No. 767,860. PATENTED AUG. 16, 1904.
J. C. BOWRING.
SPARK ARRESTER FOR LOCOMOTIVE OR OTHER BOILERS.
APPLICATION FILED FEB. 21, 1903.
NO MODEL. 2 SHEETS—SHEET 1.

Witnesses:
Jos. A. Ryan
Fred Bradford

Inventor:
John C. Bowring
By Munn & Co.
Attorneys.

No. 767,860. PATENTED AUG. 16, 1904.
J. C. BOWRING.
SPARK ARRESTER FOR LOCOMOTIVE OR OTHER BOILERS.
APPLICATION FILED FEB. 21, 1903.
NO MODEL. 2 SHEETS—SHEET 2.

Witnesses:
Jos. A. Ryan
Fred D. Bradford

Inventor
John C. Bowring
By Munn & Co.
Attorneys.

No. 767,860.

Patented August 16, 1904.

UNITED STATES PATENT OFFICE.

JOHN CHARLES BOWRING, OF SYDNEY, NEW SOUTH WALES, AUSTRALIA.

SPARK-ARRESTER FOR LOCOMOTIVE OR OTHER BOILERS.

SPECIFICATION forming part of Letters Patent No. 767,860, dated August 16, 1904.

Application filed February 21, 1903. Serial No. 144,517. (No model.)

*To all whom it may concern:*

Be it known that I, JOHN CHARLES BOWRING, a subject of the King of Great Britain, and a resident of Sydney, in the State of New South Wales, in the Commonwealth of Australia, have invented a new and Improved Spark-Arrester for Locomotive or other Boilers, with Apparatus for Controlling and Arranging the Draft Thereto, of which the following is a specification.

This invention has been specially devised with a view to afford greater facilities for preventing the escape of sparks and live cinders from locomotive and other chimneys and to provide arrangements whereby the draft may be controlled to suit the requirements of any class of fuel or any class of work, the construction and arrangement of the apparatus being so devised that it shall occupy but a small portion of the space in the smoke-box or so-called "combustion-chamber" and shall be easily removable for the purpose of cleaning the tubes and other portions and, further, shall be capable of adjustment so that the portion designated the "spark-cage" may be located higher or lower than shown in the drawings, so as to suit the requirements of any locomotive or other boiler or peculiar class of fuel.

The improved spark-arrester and the apparatus thereto in a locomotive is nominally located around and over the exhaust-tube and nozzle and is made to connect with the chimney and may be altered at either top or bottom, so as to suit the parts of any smoke-box and to make good the fittings, and the material used for the spark-cage may be sheet-steel or other material perforated, having round, square, oblong, or other suitable openings of any convenient size, such openings having their upper edges twisted or ledged so as to form louvers, which offer a resisting or baffling surface to the sparks. The spark-cage may consist of one, three, or more cages, (provision is shown for three in the drawings,) and each cage may be of similar or different material with similar or different pierced openings, according to requirements.

The improved spark-arrester comprises a cylinder or tube of iron, being either the same diameter throughout or having its upper end reduced so as to fit into the chimney and being curved or straight, according to the location of the spark-cage, so as to complete the connection between the spark-cage and the chimney. This cylinder or tube is held in position by supporting hinge-bolts hanging from the crown of the smoke-chamber, which hinge or swivel bolts support the whole apparatus. This tube has an iron band surrounding its lower end, on which hangs a telescopic band of iron having a bayonet-holder fitted with a nut to secure it to a circular plate which surrounds the exhaust-pipe at any suitable distance from the bottom of the smoke-chamber and in which circular plate are hooks or loops to which hang the spark-cages. The terminating ends of these cages fall into grooves in another plate surrounding the base of the exhaust-pipe or fitted to the floor of the smoke-chamber, according to the construction of the yoke of the exhaust. The grooves of this plate are so high and have such space between them that the cages may oscillate without coming in contact with each other and without leaving their proper position. The lower plate is in the form of a grating for the clearance of cinders or dead sparks. To this plate is also attached a baffle-plate, which controls the rush from the center tubes and protects the cages; but in order that the invention may be fully grasped reference is made to the accompanying sheets of drawings, in which—

Figure 4:
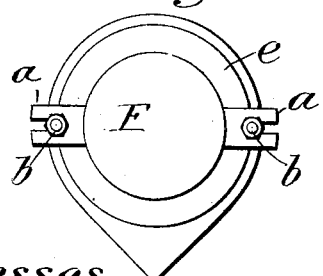
Figure 2:
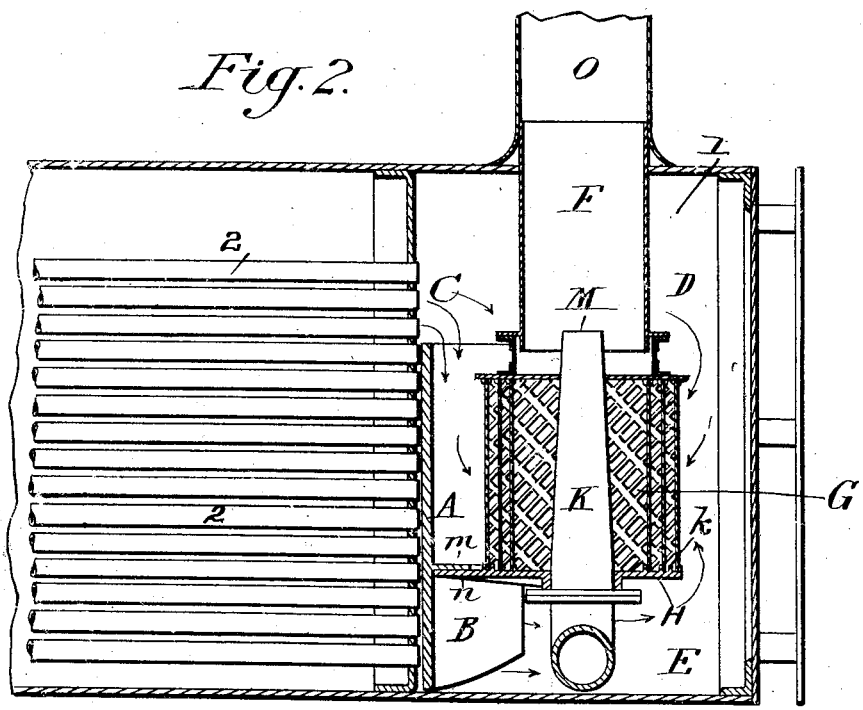
Figure 3:
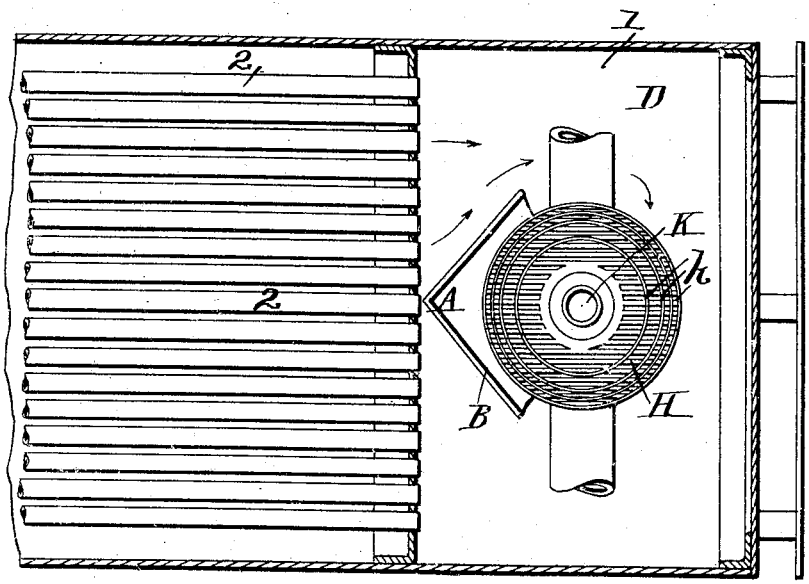

Figure 1 is a general arrangement showing the whole apparatus in position as applied. Fig. 2 is a sectional elevation of the apparatus drawn so as to cut the baffle-plate vertically through its apex, the arrows showing the movement of the fuel gases from the upper and lower tubes and the baffle distribution of these gases through the smoke-box. Fig. 3 is a plan of the apparatus, the arrows in said figure showing the movement of the fuel products from the body-tubes as they pass the baffler and the way in which they are distributed so that they may approach the spark cage or arrester with the same general force. Fig. 4 is a plan view of the funnel extension. Fig.

Figures 5, 6:
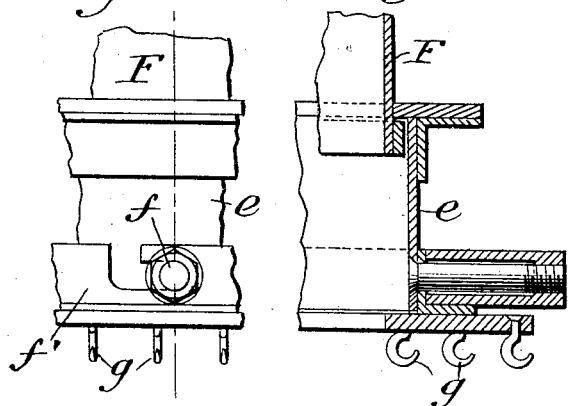
Figure 8:
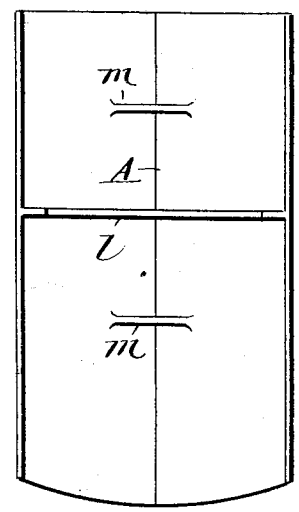
Figure 7:
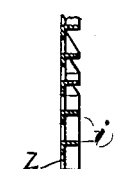

5 is a side elevation showing the bayonet-holder connected with the funnel extension or cylinder. Fig. 6 is a section of the telescope fitting-piece. Fig. 7 is a section of the material for the cages, showing the louvers to the apertures. Fig. 8 is a rear elevation of the baffle-plate, showing the strengthening-web and securing-flange.

In the drawings, 1 represents the smoke box or chamber of a locomotive or other boiler; 2, the boiler-tubes; O, the funnel or chimney, and K the exhaust-pipe.

F represents the funnel extension or cylinder made to fit within the funnel or chimney O and provided with two slotted lugs $a$ to receive the hinge-bolts $b$, hanging from the crown of the smoke-chamber, the lugs resting upon the nuts $d$ of the hinge-bolts. On the lower end of the funnel extension is hung the telescopic band $e$, having the bayonet-holder $f$, connecting the said band $e$ with the circular plate $f'$. This plate $f'$ is provided with the hooks $g$, on which the spark-cages G are hung. These spark-cages are preferably formed of steel and are provided with the openings $h$ and the ledges $i$ at the upper edge of said openings, as shown in Fig. 7.

H represents the bottom plate in the form of a grating and constituting the bottom of the spark-arrester and on which the spark-cages oscillate. This plate H has a series of circular spaced ridges $k$, forming grooves in which the lower ends of the cages loosely rest, as shown in Fig. 2.

B is the vertical baffle-plate of angular formation and having its apex A presented to the tube-plate to distribute the products of combustion through the smoke-box. The baffle-plate B has a strengthening-web $l$ and securing-lugs $m$ and is attached to a securing-lug $n$ on the bottom plate H, as shown in Fig. 2.

In Fig. 2 the arrows C show the movement of the results of combustion from the upper tubes retarded by the funnel extension F, which acts as a baffler or distributer and directs their further progress downward to the spark-cages G.

The arrows D in Figs. 2 and 3 show the movement of the fuel products from the wing and center tubes, which have been baffled by the baffler B in their course and so distributed that they approach the spark cage or arrester with equal force, thus equalizing the draft and efficiency of all the tubes.

The funnel extension or cylinder F, which connects the spark-cages with the funnel O, concentrates the give-off of the exhaust K. The nozzle end of the exhaust-pipe enters the cylinder F above the spark-cages, as shown at M in Fig. 2, so as to create a good draft and a regular draft vacuum. This arrangement is a peculiarity of this arrester.

The spark-arrester may be made of any length required. The cages may be shortened or lengthened, and the funnel extension may be lengthened or shortened, according to the length and peculiarities of the exhaust-pipe or the necessities and requirements brought about by the construction of the smoke-chamber or the peculiarities of the boiler and furnace and further to cope with the natural peculiarities of the fuel.

By releasing the nuts of the hinge-bolts, on which the lugs of the funnel extension rest, the funnel extension or tube may be turned around to release the bayonet-holder and can be easily removed. The plate with the hanging cages, comprising the remaining portion of the apparatus, can then be easily removed, the whole operation taking but a few moments, and then with all obstructions removed tube-cleaning, removal of ashes, or any other necessary work may be proceeded with.

The cages may be one or any number, according to requirements, and are so hung that they take up fully the vibration and oscillation of the locomotive.

The ridges in the bottom plate permit sufficient movement in the cages, so that the apertures may be kept clear of obstructions. At the same time these ridges keep each cage in its proper position.

The baffle-plate presents its apex to the tube-plate, and thus distributes the results of combustion so that they approach the arrester with the same general force as the whole of the contents of the smoke-box. The baffle-plate is also at sufficient distance from the cages so as to form no obstruction to the passages or apertures.

The invention in operation may be explained as follows: The results of combustion in the fire-box find their way through the tubes, and as by judicious baffling the whole of the tubes are made to draw regularly and with equal volume each tube does equal work, and the liability of non-effective tubes becoming blocked by debris is avoided. All the tubes being kept sensitive, the whole of the heating-surface is operative, giving increased results. The fuel products from the upper tubes are baffled by the cylinder F, connecting the spark cages or arrester with the funnel or out-take O. The combustion results from the center, wing, and lower tubes are baffled by the baffler B, thus giving an equal duty and draft to each of the tubes and causing all the smoke and gases to approach the spark-arrester G with the same general force. The nozzle of the exhaust being above the spark-arrester and being surrounded by the cylinder F, the volume of the exhaust is compacted and a longer and more perfect vacuum created in the smoke-box at each cough or stroke of the exhaust, thus increasing the draft and insuring its regularity with a larger nozzle than ordinarily used, giving greater steaming results.

The improved results in the steam-cylinders will also be great, for the opening of the nozzle will greatly reduce the back pressure on the pistons and improve the cylinder vacuum.

Having thus described my invention, I claim as new and desire to secure by Letters Patent—

1. In a locomotive or other boiler, a vertical cylindrical spark-arrester hung from the crown of the smoke-box and comprising a tube extending into the chimney, and a cage suspended from said tube and surrounding the exhaust-pipe, the top of the cage being located below the nozzle of said pipe, as set forth.

2. In a locomotive or other boiler, a vertical cylindrical spark-arrester hung from the crown of the smoke-box, the said arrester having a plurality of hanging cages surrounding the exhaust-pipe and located below the nozzle of said pipe, and a bottom plate on which said cages rest, as set forth.

3. The combination with the smoke-box and exhaust of a locomotive or other boiler, of a vertical cylindrical spark-arrester hung from the crown of the smoke-box, and comprising a tube extending into the chimney surmounting said box, a circular plate connected with the tube, rows of hooks on said plate, a plurality of cages hung on said hooks, and a bottom plate on which the cages rest, as set forth.

4. A spark-arrester for locomotive or other boiler, comprising a tube removably hung from the crown of the smoke-box, and extending into the chimney surmounting said box, an annular plate removably connected with said tube, a plurality of spark-cages suspended from said plate, and a bottom plate comprising a grating having a series of spaced circular ridges forming grooves in which the lower ends of the cages loosely rest, as set forth.

5. The combination with the smoke-box and exhaust of a locomotive or other boiler, of a cylindrical spark-arrester, comprising a tube extending into the chimney surmounting said box, slotted lugs on the sides of said tube, and hinge-bolts suspended from the crown of the smoke-box and engaging said lugs, as set forth.

6. In a locomotive or other boiler a vertical cylindrical spark-arrester, hung from the crown of the smoke-box, a bottom plate suitably supported, and on which said spark-arrester rests, the said spark-arrester extending into the chimney surmounting said smoke-box, and a vertical baffle-plate of angular formation, and having the apex of the angle presented to the tube-plate to distribute the results of combustion through the smoke-box, the said baffle-plate being attached to the bottom plate, as set forth.

7. The combination with the smoke-box and exhaust of a locomotive or other boiler, of a vertical cylindrical spark-arrester hung from the crown of the smoke-box and comprising a tube extending into the chimney surmounting said box, a circular plate having an interlocking connection with said tube, a sheet-metal cage suspended from said plate and having openings formed therein, the upper edges of said openings being provided with ledges to form baffling-surfaces to the upward passage of sparks, and a bottom plate suitably supported and on which the cage rests, as set forth.

8. The combination with the smoke-box and exhaust of a locomotive or other boiler, of a spark-arrester, movably hung or suspended from the crown of the smoke-box and comprising a tube leading into the chimney surmounting said box, a spark-cage surrounding the exhaust-pipe below the nozzle of the same, and an interlocking connection between said tube and said cage.

9. The combination with the smoke-box and exhaust of a locomotive or other boiler, of a spark-arrester movably hung or suspended from the crown of the smoke-box, and comprising a tube leading into the chimney surmounting said box, telescoping sections fitted to the lower end of said tube, a circular plate, an interlocking connection between the latter and said sections, and a spark-cage movably hung or suspended from said plate.

10. The combination with the smoke-box and exhaust of a locomotive or other boiler, of a spark-arrester movably hung or suspended from the crown of the smoke-box, and comprising a tube extending into the chimney surmounting said box, telescoping sections fitted to the lower end of said tube, a circular plate and a bayonet-joint connection between the latter and said sections, and a cage movably suspended from said plate.

11. The combination with the smoke-box and exhaust-pipe of a locomotive or other boiler, of a spark-arrester movably hung from the crown of the smoke-box, and comprising a tube extending into the chimney surmounting said box, telescopic sections fitting the lower end of said tube, a circular plate and a bayonet-joint connection between the latter and said sections, a plurality of concentric spark-cages, movably suspended from said plate, and a grating at the lower end of said cages, having spacing-flanges for the latter.

12. The combination with the smoke-box and exhaust of a locomotive or other boiler, of a spark-arrester movably suspended from the crown of the smoke-box, and comprising a tube extending into the chimney surmounting said box, telescoping sections fitted to the lower end of said tube, a circular plate and an interlocking connection between the same and said sections, and a spark-cage movably suspended from said plate, said cage being formed with openings having inclined ledges at the upper edges thereof.

13. The combination with the smoke-box and exhaust of a locomotive or other boiler, of a spark-arrester comprising a tube, movably suspended from the crown of said smoke-box, and a spark-cage detachably connected to said tube and having a swinging support therefrom, the spark-cage surrounding the exhaust-pipe and the upper edge of said cage being below the nozzle of the exhaust.

14. A spark-arrester comprising a plurality of spark-cages, and a grating at the lower end thereof, the said grating having a series of spaced circular ridges forming grooves to receive the edges of the several cages and space the cages apart.

JOHN CHARLES BOWRING.

Witnesses:
L. C. RUSSELL JONES,
JOHN A. J. POST.